United States Patent
Bertz et al.

(10) Patent No.: US 8,214,520 B1
(45) Date of Patent: **\*Jul. 3, 2012**

(54) AUTOMATED NETWORK SOURCE CHANGES FOR REAL-TIME STREAMING MEDIA

(75) Inventors: Lyle T. Bertz, Lee's Summit, MO (US); Ayodeji Abidogun, Overland Park, KS (US); Badri P. Subramanyan, Overland Park, KS (US); Yaojun Sun, South Riding, VA (US); John W. Davis, Kansas City, MO (US)

(73) Assignee: Sprint Communications Company L.P., Overland Park, KS (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/022,280

(22) Filed: Feb. 7, 2011

Related U.S. Application Data

(63) Continuation of application No. 12/235,330, filed on Sep. 22, 2008, now Pat. No. 7,930,421.

(51) Int. Cl.
*G06F 15/16* (2006.01)
*G06F 15/173* (2006.01)
*H04W 36/00* (2009.01)
*H04N 7/18* (2006.01)

(52) U.S. Cl. ........ 709/231; 709/243; 709/249; 455/436; 725/81

(58) Field of Classification Search .................. 709/231, 709/243, 249; 455/436; 725/81
See application file for complete search history.

(56) References Cited

U.S. PATENT DOCUMENTS

| | | | | |
|---|---|---|---|---|
| 5,768,539 | A | * | 6/1998 | Metz et al. ..................... 709/249 |
| 5,774,461 | A | * | 6/1998 | Hyden et al. ............... 370/310.2 |
| 6,088,591 | A | * | 7/2000 | Trompower et al. .......... 455/438 |
| 6,414,950 | B1 | * | 7/2002 | Rai et al. ....................... 370/338 |
| 2005/0005025 | A1 | * | 1/2005 | Harville et al. ............... 709/241 |

\* cited by examiner

*Primary Examiner* — Ranodhi Serrao

(57) ABSTRACT

Media, methods and systems are provided for coordinating changes of network sources for media streams in a telecommunications network. The streams communicate instances of media content via packets to devices. A first network source streams packets of an instance of media content to a device. Each packet includes information regarding the temporal ordering of that packet within the instance and information regarding the sequencing of the packet within the stream. It is determined that a second network source should stream the instance of media content. A point in the temporal ordering within the instance is identified and communicated at which the second network source will provide the instance of media content. The second network source streams to the mobile device the instance of media content from the identified point, without requiring adjustment of the information regarding the sequencing of the packets within the stream.

17 Claims, 5 Drawing Sheets

AUTOMATED NETWORK SOURCE CHANGES FOR REAL-TIME STREAMING MEDIA

CROSS-REFERENCE TO RELATED APPLICATIONS

This application is a continuation of U.S. Pat. No. 7,930,421, filed Sep. 22, 2008, the disclosure of which is hereby incorporated herein, in its entirety, by reference.

BACKGROUND

Large mobile telecommunications networks now boast virtually complete coverage of most areas. The services provided by these networks are expanding as more and more devices possess multi-media capabilities. As a result, services consume ever-increasing bandwidth, and network providers seek methods of streamlining the provision of services in order to maintain adequate quality of service. Redundancy of equipment that can offer the same services from one area to another allows a provider to decrease long-distance transmission and with it bandwidth consumption. Redundancy within the same area allows a provider to better balance the load experienced by any one piece of equipment and keep service levels high. However, the ability to change from one network element to another can encounter difficulties when the service involves certain protocols.

SUMMARY

Embodiments of the invention are defined by the claims below. A high-level overview of embodiments of the invention is provided.

In a first embodiment, a computer-implemented method coordinates changing of network sources for media streams in a telecommunications network. The streams communicate instances of media content via packets to mobile devices. A first network source streams to a mobile device packets of an instance of media content. Each packet includes information regarding the temporal ordering of that packet within the instance and information regarding the sequencing of the packet within the stream. It is determined that a second network source should stream the instance of media content. A point in the temporal ordering within the instance is identified and communicated at which the second network source will provide the instance of media content. The second network source streams to the mobile device the instance of media content from the identified point, without requiring adjustment of the information regarding the sequencing of the packets within the stream.

In a second embodiment, computer-readable media change a server of packet streams of an instance of media content from a first server to a second server. The first and second servers having identical copies of the instance. A streaming session is initiated by communicating the instance in a first stream of packets from a first server to a recipient. A point in the temporal ordering within the instance is identified and communicated to a second server. This is the point at which the instance will be streamed from the second server. A second stream of packets is communicated from the second server. The recipient does not experience an interruption in the streaming session and does not experience an interruption in execution of the instance.

In a third embodiment, a system streams instances of media content from multiple network servers. The system is configured to stream a plurality of instances of media content and to communicate information associated with changing from a first server to a second server to stream one or more instances of the plurality. The information to make such a change is included in each packet of a stream.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Figure 1:
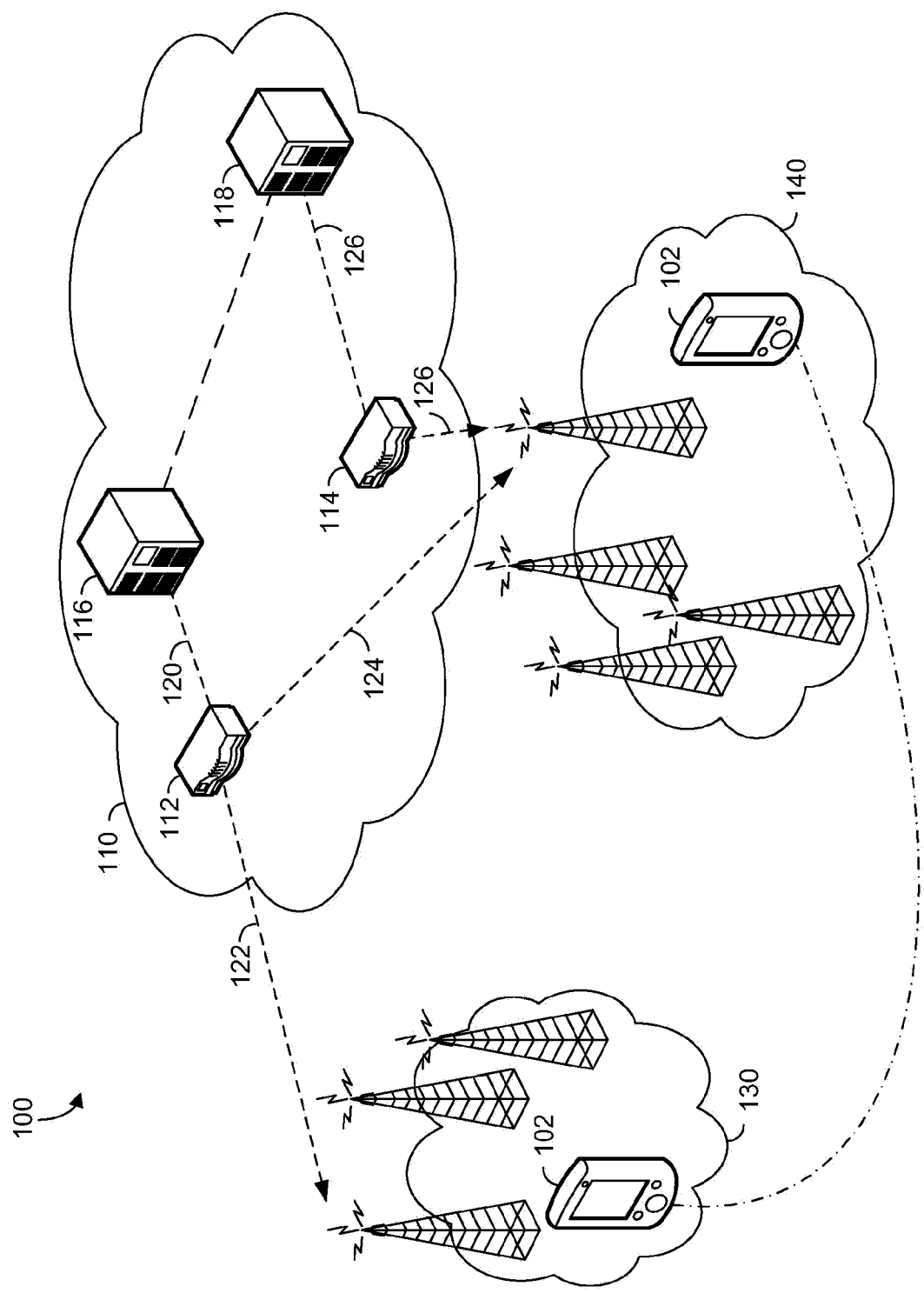
FIG. 1 depicts a first exemplary network in which aspects of the invention can be practiced in accordance with certain embodiments.

Embodiments of the invention provide methods, media, and systems for changing the network element that provides a streaming media experience to a device. More specifically, servers that communicate media instances according to real-time transport protocol (RTP) can be switched, so that a device may receive a streaming media instance from one server, and later receive the same instance in an uninterrupted manner from a second or subsequent server. Instances of media content include a number of forms and formats that are consistent with the RTP standard. Many previous solutions have relied on so-called "mixers," or elements that receive streams from multiple sources then communicate them to the device with a consistent sequence numbering progression. This ultimately limits the device from receiving streams more directly from multiple sources, as any of the multiplicity of servers must feed its streaming media to the mixer prior to communicating it to the device. In other words, "directly" should not infer nothing in between (routers, switches, etc.), but from a server to a device without a mixer in between. Using the claimed embodiments, such an intermediary element is not required, allowing the stream to be communicated from the most efficient element available to the device. Rather than require a particular element to stream the instance to the user, packet information includes an internal reference for ordering the packets that is stream independent. By doing so, the change in devices results in a seamless transition by eliminating difficulties associated with maintaining the packet sequence.

Throughout the description of the embodiments of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the embodiments of the invention. The following is a list of these acronyms:

| | |
|---|---|
| ASN | Access Service Network |
| AVI | Audio Video Interleave |
| BTS | Base Transceiver Station |
| CSN | Connectivity Services Network |
| CD-ROM | Compact Disc-Read Only Memory |
| DVD | Digital Versatile Discs |
| EEPROM | Electronically Erasable Programmable Read Only Memory |
| MPEG | Motion Picture Experts Group |
| MP3 | MPEG-1 Standard, Layer 3 |
| RTCP | Real-Time Transport Control Protocol |
| RTP | Real-Time Transport Protocol |
| RTSP | Real-Time Streaming Protocol |
| RAM | Random Access Memory |
| ROM | Read Only Memory |
| SMPTE | Society of Motion Picture and Television Engineers |
| WAV | Waveform audio format |

Further, various technical terms are used throughout this description. An illustrative resource that fleshes out various aspects of these terms can be found in Newton's Telecom Dictionary by H. Newton, 24th Edition (2008).

Embodiments of the invention include, among other things: a method, system, or computer-program product. Accordingly, the embodiments may take the form of a hardware embodiment, a software embodiment, or an embodiment combining software and hardware. In one embodiment, the invention takes the form of a computer-program product that includes computer-useable instructions embodied on one or more computer-readable media.

Computer-readable media include both volatile and nonvolatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The claimed embodiments of the invention provide, among other things, methods for changing the network source of an instance of streaming media in a telecommunications environment. A network source, as it will be described below, is typically a server that is configured to provide streaming media. This is most often seen in the form of an application server. Such an application server may be part of a network provider's network, or it may be found on a different network. In the latter case, the streaming media server may be one available via the internet. In the following description, a source, a server, and a streaming media server will be understood to be synonymous. An application server, when described in the following context, will be one that is configured to stream media content, and thus also synonymous with the above terms. The server configured to provide streaming media instances will be one that uses the real-time transport protocol (RTP) or a similarly compatible variant. RTP is a standard established primarily for the streaming of audio and video signals in packet-based networks. However, it can be used for any data that requires a real-time execution component, such as computer simulations. It is defined by Request for Comments (RFC) 3550 of the Internet Engineering Task Force (IETF). RTP relies on lower-level protocols, most notably the user datagram protocol (UDP), because of a relative lack of packet loss in UDP. The fact that streams are communicated with a real-time component also makes delay a concern, once again making UDP a good choice for its basis. Only able to send data from sender to receiver, RTP is used in conjunction with real-time transport control protocol (RTCP) and real time streaming protocol (RTSP). Each of these standards provide controls and commands, such as setup and tear down instructions, so that the actual data transport that RTP provides is communicated in the manner intended. The execution of streaming media involves reception and buffering of packets. As packets are de-buffered and executed, more packets are received. This allows large files to be received and executed without utilizing the memory required to download and execute the entire file. However, the constant reception, buffering, de-buffering, and execution of this protocol necessarily requires strict ordering of the packets.

The following description will be given with regard to instances of streaming media content. This can be a number of media such as, but not limited to, audio, video, and audio-video combinations. Common examples are television programming, video on demand, radio programming, voice over Internet Protocol (VoIP) calling, video conferencing, push-to-talk telephone technology, and others. This list is not intended to be exhaustive, but merely exemplary of the types of streams that would normally be encountered in a real-time, streaming media context. As would be expected from this varied list, a number of formats in standard and high-definition media transmission are contemplated, such as Motion Pictures Experts Group (MPEG) standards 1, 2, and 4 (including the MPEG-1 Layer 3 or MP3 format), Audio Video Interleave (AVI), and Waveform Audio format (WAV), and others, although this again is illustrative and not exhaustive.

When one streams media instances as diverse as those indicated on the above list, bandwidth consumption and other network parameters vary greatly depending on the format. However, for the purpose of this disclosure embodiments will be described within the context of video streaming, and even more particularly high-definition video. Video streaming, especially high-definition video, consumes a great deal more bandwidth than many of the other mentioned formats. Requiring more information for the high-definition visual representations, tight synchronization between the audio and visual components, and a host of other concerns means that these types of streams may be orders of magnitude greater than other formats. However, any streaming method will benefit from the described embodiments of the invention. Describing these streams as bandwidth-intensive examples does not need to limit them to such. Simple issues of latency can also render the embodiments of the invention useful for smaller streams. However, a set of problems are associated with larger consumption streams from both for the media consumer and the network provider point of view. An example is clear when in a mobile media environment. In order to access the instance of streaming media content, a user must connect with an access point, such as a Wi-Fi hotspot, a cellular telephony base transceiver station (BTS), a wireless microwave access point, or something similar. While all are intended to provide mobility, some of these access methods do not allow for so-called "handoff," that is to say the movement from one access point to another. In the above list, a user is unable to move from one Wi-Fi hotspot to another and stream continuously.

Other access technologies, cellular telephony or wireless microwave access for example, allow the user to move from one point to another. In order to continuously provide streaming media, a single streaming source is used, i.e. a streaming media server. However, the access point to which that source's stream is sent may vary. For examples, a user riding in a car may receive streaming media from a tower A for the first few moments of streaming the content, but minutes later may be miles away and streaming from a tower B. Therefore, the server used has not changed, but the routing of that streaming signal has changed. This can lead to inefficiencies.

To carry the previous example one step further, during the course of a two-hour movie, rather than a few miles removed from his or her original streaming location, the user may be more than 100 miles away. Instead of a simple change from tower A to tower B as described above, the user may have traveled from metropolitan area A to area B to area C. In addition to the many different towers from which the user has received the signal for this streaming instance, the change in location has now affected the basic network infrastructure handling the user's stream. An exemplary user traveling north from Washington, D.C., may have left the portions of the network that serve the nation's capital, traveled through Baltimore, Md.'s service area, and may now be enjoying the stream through the services of the portion of the network serving the metropolitan Philadelphia, Pa., area. Each of these service areas may have redundancies built in to each respective network so that resources are conserved. A server used to stream television broadcasting in Baltimore may be replicated in Washington or Philadelphia, as the additional server is much more cost effective than using bandwidth to transmit the stream from Baltimore to one of the other areas. In the above scenario of a user traveling in a car, when streaming continuously from the same source, the redundancies built into each network are wasted. Redundant servers in the Philadelphia area that may more efficiently provide the stream are not utilized, and the stream must be transported from Washington to Philadelphia. This results in increased transport time of the stream and unnecessary consumption of "backbone" bandwidth between areas.

In order to allow a handoff of an RTP stream, the initial information received to set up the stream can be forwarded from a first server to a second server. If information included in the stream can be leveraged to reduce the transactions needed for this handoff to occur, then many of the difficulties associated with accomplishing such a switch in sources can be removed. An efficient manner with which to do this is the use of an internal timing mechanism rather than a stream's packet sequence number. One internal mechanism is the Society of Motion Picture and Television Engineers (SMPTE) timecode that is present for video. This is the code that is the same for any given instance across all formats and playback methods. Thus, the tenth minute and first second of movie A is the same, regardless of the format.

Packet sequencing numbers used in the stream, on the other hand, are randomly selected and may start from any point. Suppose the first 10 minutes of a movie are streamed from a first source and the last 110 minutes are streamed from a second source. Also suppose for the sake of simplicity that one packet is communicated per second of video. This results in 600 packets being communicated from the first source and 6600 packets communicated from the second source. However, the sequence number for the two streams are randomly selected, so the first source can send packets in the first portion of the stream with sequence numbers 1400-2000 and the second source could send packets with sequence numbers 200-6800. A device attempting to receive and execute the instance after a switch in sources that relies on the sequencing information will encounter the packet with sequence number 2000 at the 600th second of the movie and the packet with sequence number 200 for the following second. Utilizing the internal timing mechanism as an alternative to the sequencing information avoids this "out-of-order" situation. If the instance is known to be identical to the previous instance— e.g., the file streamed from a first server is identical to the instance streamed from a second server—then the internal timing information will not vary. Simply stated, the 601st second of the instance is the 601st second of the instance regardless from what source the instance is being streamed. Utilization of the SMPTE timecode, for this and other reasons, helps reduce the processing overhead and difficulty of transitioning. In addition, the same instance of content in different formats and resolutions can be successfully transitioned. An example include switching from a high-definition stream to a lower resolution stream, which saves bandwidth when such a reduction in resolution is needed. Other examples can be seen in the change from a portrait to landscape image orientation or from one aspect ratio to another, i.e. from a widescreen to standard screen format. All of these changes can rely on the SMPTE information to successfully make the switch seamlessly, and therefore leveraging that information from the onset of a connection provides a manner for streaming the instance from the most appropriate source.

An exemplary telecommunications network useful for implementing the claimed embodiments of the invention will now be described further and it has two portions—a network configured to provide connectivity services and one or more networks configured to provide access services. The one or more access services networks are made up of the equipment to allow users an initial entry point on the overall telecommunications network. This can be seen with a cellular base transceiver station (BTS) and the tower associated with it, which may operate in a number of protocols and formats. This is consistent with the description above of access networks that provide services to specific geographic areas. However, access can also be seen on a smaller scale, such as that available through a "femto cell" BTS. These devices are primarily used for much smaller areas, typically indoors, and are specific to just a few devices. Those devices that are authorized to use the femto cell are then provided access to the network provider's network through a broadband internet connection. The second portion, the connectivity services network, is the backbone of the overall network that allows the provider to connect access service networks, provide general services, track use from quality of service and financial standpoints, and generally maintain the network through upkeep and repair. There are translation points either between or within these networks that allow disparate elements to communicate, so that a BTS may be able to communicate with an application server, a server configured for billing information may be able to accept information from a controller, or the like. The access and connectivity services networks may each contain hundreds or even thousands of other network elements providing a myriad of functions. They will not be described here so as to not obscure the claimed embodiments of the invention, nor will they be limiting to the scope of the invention.

Turning to FIG. 1, an exemplary telecommunications network 100 for practicing embodiments of the invention is depicted. Network 100 has the two portions described above, shown as a connectivity services network 110, along with an access services network (ASN) 130, and an ASN 140. The ASNs 130 and 140 can be located in adjoining geographical areas, or can be from two areas of a completely distinct nature. Several BTS units and associated towers are shown in each ASN, but are not numbered for the sake of clarity. The number or nature of the BTS and towers should not be construed as limiting. In fact, a tower is not needed at all as previously mentioned. For example, a "femto cell" could just as easily provide the access needed for the network. Both ASN 130 and ASN 140 show a device 102, which is connected with a dotted line. These are not two separate devices. Rather, this is to denote that device 102 may move from one ASN to the other within some time period.

Connectivity services network 110 has a first application server 116 and a second application server 118. Each server is configured for steaming media instances to a user as described above and below, such as through a gateway 112 or through a gateway 114, respectively. A first stream to device 102 is first sent through gateway 112 to ASN 130. A stream 120 depicts the flow of packets for this media stream to gateway 112, with a stream 122 representing the same stream from gateway 112 to ASN 130. Once device 102 has moved to ASN 140, a second stream from gateway 112 is shown. A stream 124 depicts the flow of packets for the same instance of media content being sent to a different ASN, so that device 102 can continue receiving the instance of media content.

A dotted line depicts communication between server 116 and server 118. This will be described in further detail below, but can take many forms. The communication between servers allows for the second server, in this case server 118, to begin streaming the instance to the user. Once the switch from server 116 to server 118 occurs, server 118 provides the instance of media content via a stream 126. This is then sent to ASN 140 via gateway 114, eventually replacing stream 124. As user 102 receives the stream, first from server 116 and later from server 118, there is no interruption in the stream.

The claimed embodiments do not limit the invention to "direct" communication between server 116 and server 118. A central network control can be used in order to both monitor the need for a change in streaming source, and for the communication of handoff information. Rather than have a first server send information to a second server, a central network controller can receive such information. The network controller can also determine which device should be used as a second or subsequent source. Therefore, the controller can also play a role in the determination of the handoff as well as the communication process.

Figure 2:
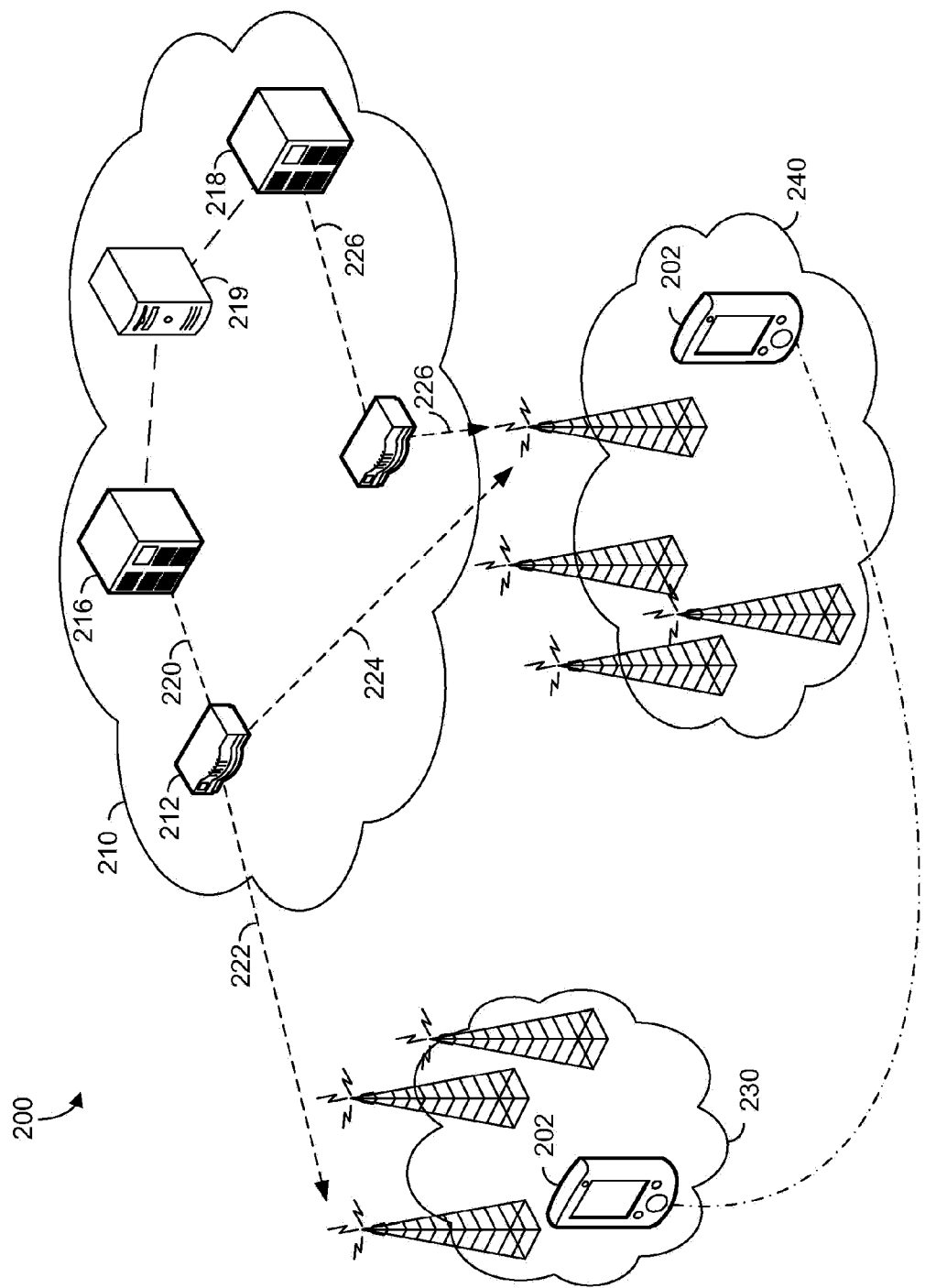
FIG. 2 depicts a second exemplary network in which aspects of the invention can be practiced in accordance with certain embodiments.

A depiction of this configuration can be seen in FIG. 2. A telecommunications network 200 is shown with substantially similar features to network 100. Elements have the same last two digits for numbering similar features where applicable. For instance, servers 116 and 118 are represented in FIG. 2 with servers 216 and 218. The individual elements and connections are virtually the same as the prior figure, with the addition of a central network controller 219 and a lack of direct communication between server 216 and server 218. Instead, the servers communicate through controller 219, which also monitors each server and their operation. There are several exemplary operations that controller 219 can perform. For instance, if there are a number of streams being provided by server 216, such that performance is compromised, controller 219 can examine other servers to identify a source with untapped capacity and change the source of the stream. The determination of a subsequent server to provide the stream, e.g. server 218, allows controller 219 to communicate from handoff information server 216. The configuration depicted in FIG. 2 should not be construed as limiting server 216 and 218 as only communicating directly or through an intermediary element, such as controller 219. A third configuration could just as easily allow for controller 219 to determine the switch is in order, but allow server 216 and server 218 to communicate without the use of controller 219. Likewise, another configuration not shown could allow the first source to determine a change is in order and communicate that information to a controller, but then rely on that controller to determine what secondary source should be contacted. Any subsequent handoff could then be coordinated with or without the controller, that is to say by the controller or the server performing the handoff, before the second source ultimately provides the stream.

Methods will now be disclosed whereby the source from which an instance of streaming media content is communicated can be switched from a first source to a second source. The connection between the first source and device is established utilizing a standard RTSP setup message for a particular Universal Resource Locator (URL). Utilizing several sources of information, the determination can be made that a different source should provide the instance of media content. The first source then requests a handoff to a second source, which includes information with which to make the change. This includes data about the handoff, such as the session description and the SMPTE timecode at which the first server is making the handoff request. It does not need to include sequence number data, as the sequence number is unnecessary with the use of the timecode. The second source then acknowledges and includes pertinent information of its own. This can take the form of a RTSP acknowledgement, the SMPTE timecode at which the handoff will occur, and other RTP information as needed. The first source provides a request to the device receiving the stream that a redirection take place to the second source. Location information of the second source, necessary RTP information and needed clock information is provided as part of this request. Once received, the device provides acknowledgement to both sources, resulting in the second source providing the stream. This can be as simple as a "200 OK" message by RTSP. The acknowledgement of the handoff allows the second source to begin streaming at the designated timecode. Once the stream is beyond a window during which a retransmission from the first source may be necessary, that first source is released from communications with the device through RTCP messaging.

Figure 3:
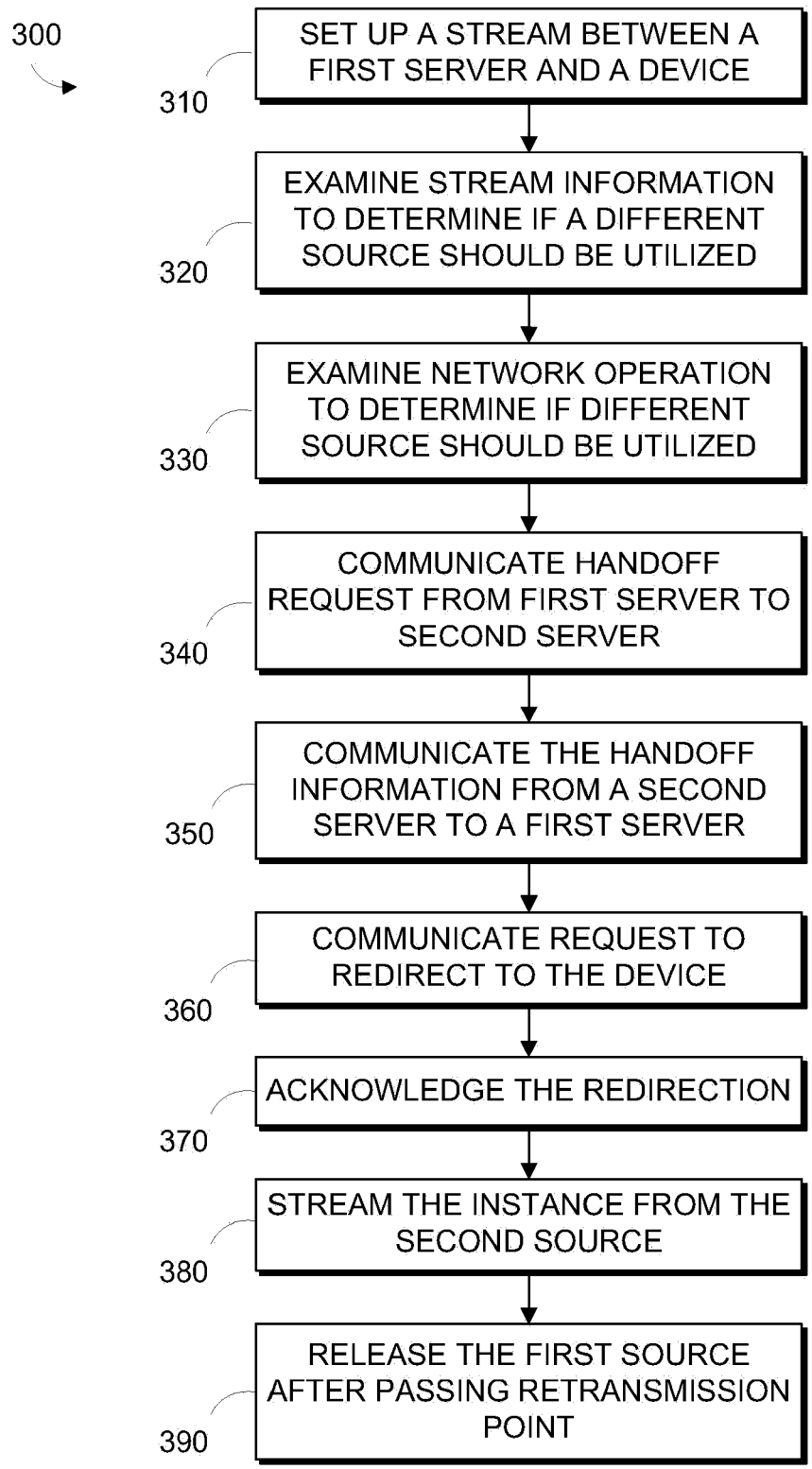
FIG. 3 is a method for switching sources from which an RTP stream is provided according to embodiments of the invention.

FIG. 3 depicts an exemplary method 300 for switching sources serving an instance of media content is outlined. At a step 310, a stream is set up between a first server and a device. The stream information is examined at a step 320 to determine if a different source should be utilized. At a step 330, network operation is examined to determine if a different source should be utilized. Steps 320 and 330 will be described in further detail below with respect to FIG. 4, but step 320 is an examination of the packets themselves, while step 330 is an examination of the network conditions through use of a controller. At a step 340, a request to handoff the stream is communicated from the first server to a second server. The required handoff information is communicated from the second server to the first server at a step 350. Both steps 340 and 350 use the RTSP messaging described earlier. Unnecessary in the exchange to setup the handoff is information regarding the sequence number, as potential problems with non-consecutively numbered but sequential packets are avoided. A redirection request, using RTSP in the described embodiments, is communicated from the first server to device at a step 360. Streaming protocol acknowledgment of the redirection is sent at a step 370, such as through the "200 OK" messaging. At a step 380, the instance is streamed from a second source, from the point identified in steps 340 and 350. After there is no longer a possible need for the first source to retransmit packets, that first source is released at a step 390 through the aforementioned control protocol messaging.

Whether completed by the first source or by a central controller, the determination of a necessary change for network sources of streaming media instances can follow an algorithmic approach. The examination of certain data can follow a progression in order to come to such a determination. In certain embodiments, packet header information can first be examined to see if there are factors that suggest a change of source is appropriate. For example, the location of the device can be looked at to determine if the destination device is in a geographic area served by the source. The information used for routing the packets can show that a user is in a different geographic area better served by servers in that area. Likewise, factors such as latency feedback in the form of timestamps may show that the first server is not the proper source from which the stream should be sent. The first server can receive data showing that a latency threshold has been surpassed, and therefore the delay jeopardizes the quality of service to the device. Rather than use timestamps received at the server, the central controller may be able to examine the stream for a more sophisticated latency calculation. Also plausible is the use of a certain amount of a server's capacity. Once that amount is surpassed, the server could look for other servers appropriate for providing the stream, or communicate such overload conditions to a controller.

The most efficient manner for determining that a first server is not appropriate for the service could reside in a central network controller, or in a dispersed group of controllers that collectively can make decisions regarding the entire network. For example, a central network controller may be able to sample packets transmitted in the network to see from what server and to what access networks streams of media content are being communicated. Such a central controller could do so with direct communication to and from network elements, or could send and receive this information from the aforementioned group of controllers located throughout the network. The set of controllers could also monitor the usage of server resources and effectively load-balance the streams provided to a multiplicity of users, without waiting for "self-reporting" by the servers themselves.

Centralized controllers could also be used to monitor patterns in usage. Take the example of a commuter that exhibits a pattern of using one set of resources at the beginning of a commute, but being better served by a second set of resources at some time later. If this occurs on a daily basis, then the switch in sources could be predetermined based on the typical patterns so that it automatically occurs after a pre-set amount of time. A user who travels by bus or light rail daily from the fringes of one area to another, e.g. San Diego to Los Angeles, Calif., will have a point during which the stream could be originated from a different source. Another patterned example is that of someone on a trip traveling in a somewhat linear fashion. The continued change of appropriate source for someone heading east to west along a major interstate could be somewhat pre-determined. A handoff point would then be calculated based on continued travel using the established pattern. A user following the interstate-70 corridor from Indianapolis to St. Louis exhibits an east-to-west movement with a certain average rate. Extrapolation allows that user to have handoff information calculated for another change to Kansas City, if that user continued traveling past St. Louis. Unless a change occurs, i.e. the user's movement stops along the route, then a point at which a Kansas City source becomes more efficient is an inevitable consequence.

Figure 4:
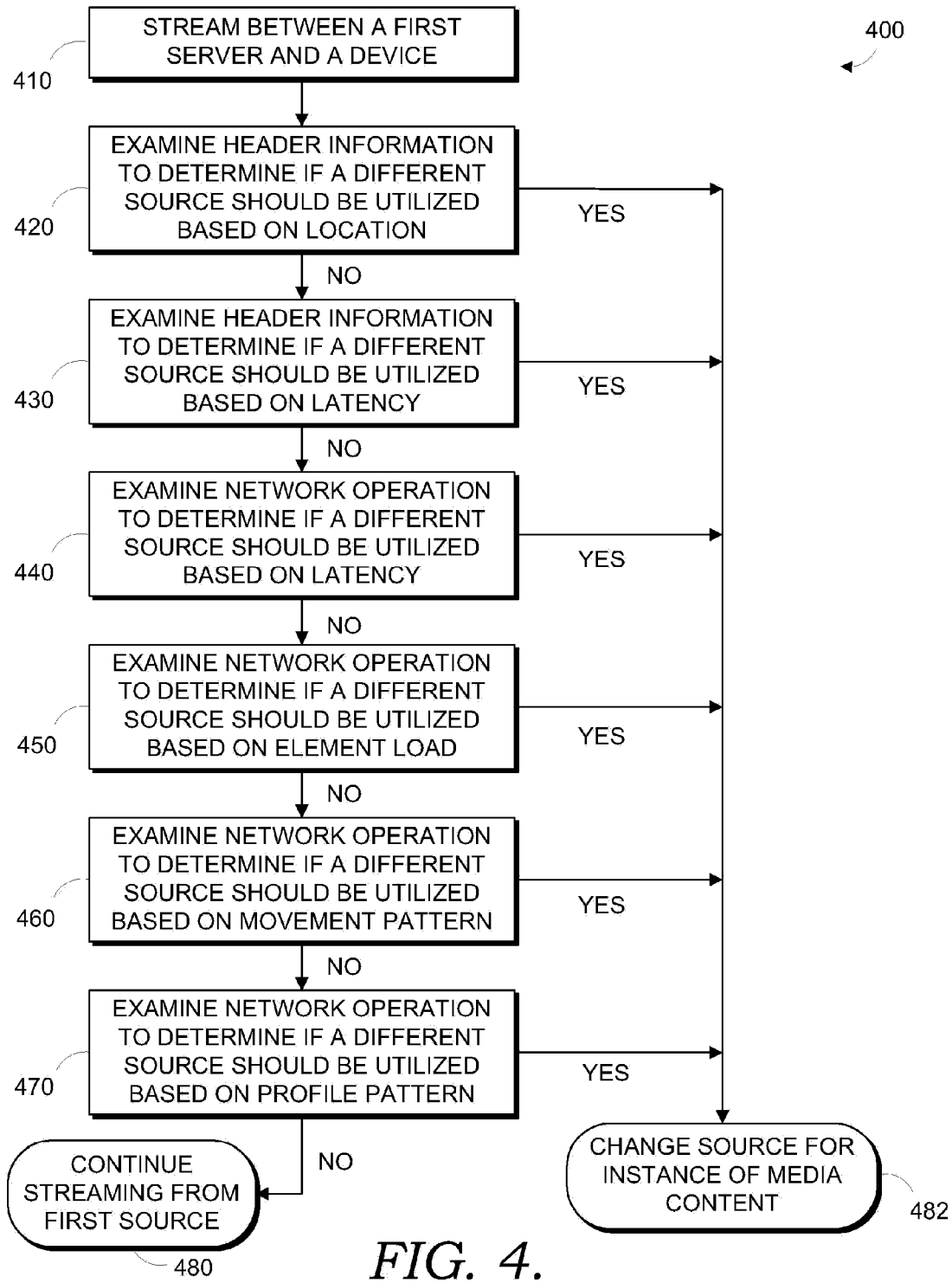
FIG. 4 is a method for determining if a second or subsequent source should be utilized for streaming an instance of media content in accordance with embodiments of the invention.

FIG. 4 depicts another exemplary method 400 for determining the proper source of an instance of streaming media. At a step 410, an instance of media content is streamed from a first server. At any of the remaining steps in the determination, an affirmative response results in streaming the instance of media content from a different source and thus changing servers at a step 482. At a step 420, header information can be examined to determine if a different source should be utilized based on the location indicated for both the device and source. If that is not a basis for changing sources, at a step 430 the header information is examined to see if a change is appropriate based on latency measurement. If not required by step 430, a step 440 examines the latency measurements seen through monitoring the network operations. If once again that does not precipitate a change in sources, network operation is again monitored to see if a change is warranted based on element load at a step 450. At a step 460, a movement pattern is examined to determine if a change is needed. A profile pattern based on a user's habits is examined at a step 470 to determine if the change should be required. If, after those steps, no change has been deemed necessary, then the stream continues to be provided by the first server at a step 480. As mentioned previously though, any time the change is determined to be required results in the change of sources at step 482. The determination at step 482 would then lead the handoff procedures described above.

The actual flow of messages between a device and two servers can be followed in terms of the messages sent and the paths that they follow. For instance, a device may send a request to a first server to initiate a streaming session. The first server may stream the packets required for that instance, but calculate that a more efficient source may be available. The first server may contact the more efficient source, which will be referred to as a second server. The first server sends the second server handoff information, such as the point in time in the instance of media content at which the hand off should occur. An acknowledgement would be sent from the second server to the first server, triggering a redirection request to the device. Once that is acknowledged from the device to the first server and eventually to the second server, the second server may stream the instance to the device. At the designated time, the second server will begin streaming the instance to the device. Once the second server is streaming the instance and the need for any recovery information from the first server has passed, the first server will send a message showing it will no longer be connected to the device. This process could continue, as the first server could be replaced by the second server, and any subsequent source could replace the second streaming server.

Figure 5:
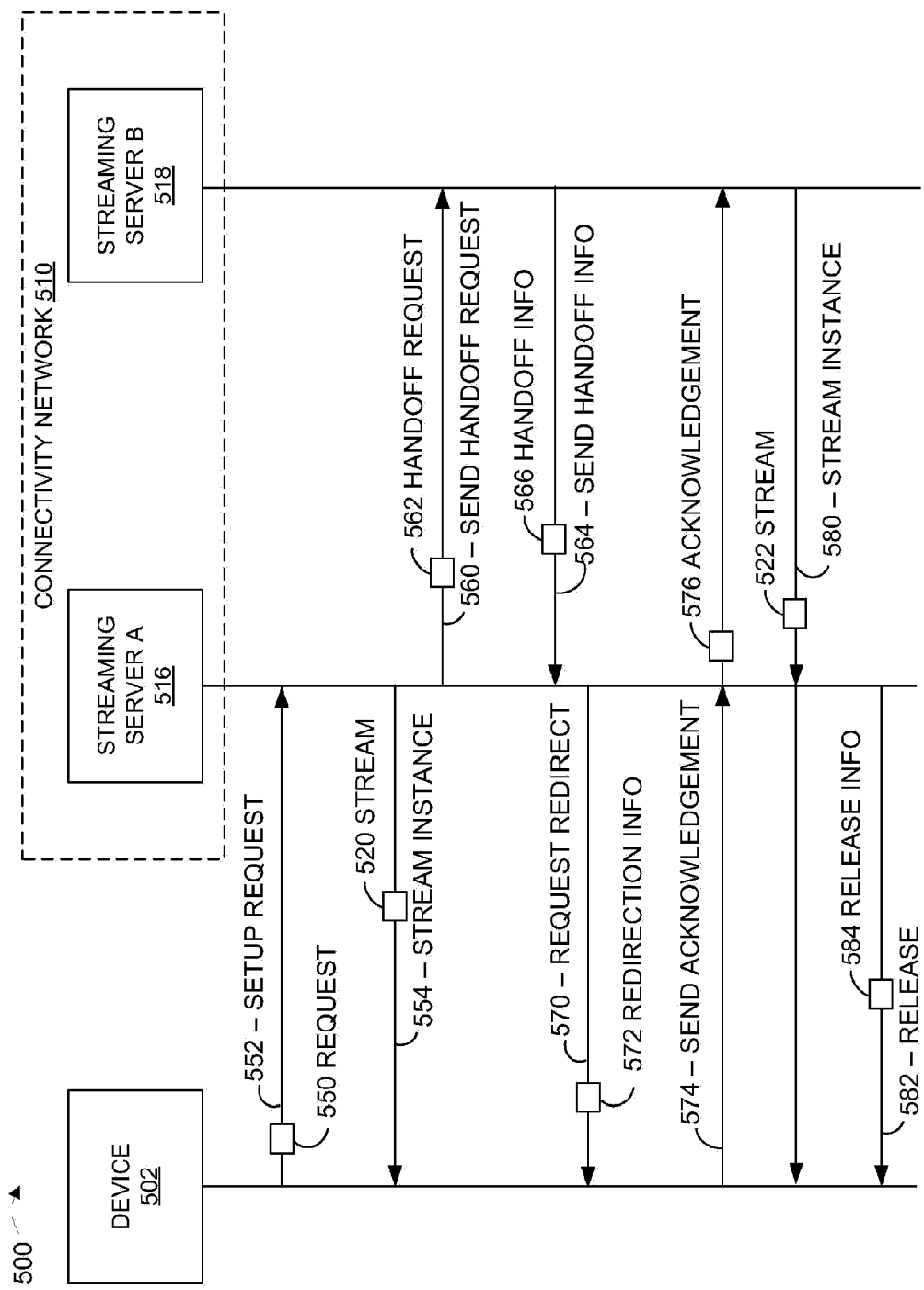
FIG. 5 depicts a flow of information associated with a handoff between sources according to embodiments of the invention.

Turning now to FIG. 5, a flow of information 500 associated with a handoff is depicted according to embodiments of the invention. A device 502 is in contact with a first streaming server 516 and a second streaming server 518, which are part of a network 510 that provides connectivity services. At a step 552, a request 550 is sent from device 502 to server 516. This can be the RTSP set up request that includes the URL from which the stream will originate. In response to request 550, server 516 performs a step 554 of streaming an instance of media content, which is represented by a stream 520. At a step 560, a handoff request 562 is communicated from server 516 to server 518. As mentioned previously, step 560 should not be construed as limiting the embodiments of the invention to direct communication only. This is simply the communication of the request information, timecode data, and session description information as previously discussed. It can be accomplished from server to server, via a controller, or in any other manner most efficient. A set of handoff information 566 is sent from server 518 to server 516. This includes information such as the acknowledgement of the request and the information pertinent to the point during which the handoff occurs. Included will be timecode information and other RTP information.

At a step 570, a redirection request 572 is communicated from server 516 to the device 502. Redirection request 572 is another signaling protocol request. This includes RTP information, clock parameters, and timecode information. At a step 574, an acknowledgement 576 of the redirection request, i.e. a "200 OK" message, is sent to both servers 516 and 518, allowing server 518 to stream the instance at a step 580. A stream 522 originates from server 518 and is received by device 502. This continues streaming the same instance provided by stream 520, simply from the SMPTE timecode determined in the handoff request. Once all packets from server 516 have been received and executed, releasing the need for server 516 to send any more packets, server 516 sends a release message 584 utilizing control protocol messages at a step 582.

Many different arrangements of the various components depicted, as well as components not shown, are possible without departing from the spirit and scope of the present invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media with computer-executable instructions embodied thereon to change a server of packet streams of an instance of media content from a first server to a second server, the first and second servers having copies of the same instance of media content, the method comprising:
    initiating a streaming session by communicating the instance in a first stream of packets from a first server to a recipient;
    identifying and communicating to a second server a point in the temporal ordering within the instance at which the instance will be streamed from the second server;
    communicating a second stream of packets from the second server, wherein the recipient does not experience an interruption in the streaming session and does not experience an interruption in execution of the instance;
    identifying and communicating to one or more subsequent servers one or more points in the temporal ordering at which the instance will be sent from a subsequent server; and
    communicating subsequent streams of packets from subsequent servers, wherein the recipient does not experience an interruption in the streaming session and does not experience an interruption in execution of the instance.

2. The media of claim 1, wherein the session is compatible with a packet-based real-time transport protocol.

3. The media of claim 1, wherein the point in the temporal ordering in the instance is identified by information in a packet header field.

4. The media of claim 1, wherein the instance is video content and the first and second copy differ by at least one of: resolution of images, orientation of images, and aspect ratio of images.

5. A system for handing off streaming of an instance of media content from a first server to a second server, the system comprising:
    a first server having a processor or memory and configured to provide a first stream of an instance of media content and to communicate information associated with handing off provision of the first stream from the first server to a second server, the information indicating a point in the temporal ordering within the instance at which provision of the instance will be handed off to the second server, wherein the instance of media content is comprised of a plurality of data packets and each packet includes an indication of the temporal ordering thereof; and
    a second server configured to provide a second stream of the instance of the media content and to receive a communication of the information from the first server, the second server beginning provision of the second stream of the instance at the point in the temporal ordering within the instance, the second server configured to identify and communicate to one or more subsequent servers one or more points in the temporal ordering at which the instance will be sent from one of the subsequent servers; and
    the subsequent server configured to provide a subsequent stream of the instance of the media content, wherein a recipient of the instance of media content does not experience an interruption in a streaming session associated with the instance and does not experience an interruption in execution of the instance.

6. The system of claim 5, wherein the first and second servers are configured to stream instances compatible with a real-time transport protocol.

7. The system of claim 5, wherein the instance is video content.

8. The system of claim 5, wherein the information is contained within one or more packet header fields used to denote a relative point in the temporal ordering of the packets within the instance.

9. The system of claim 8, wherein the information in the packet header field denoting a relative point in the temporal ordering of the packets within the instance is not an indication of the relative ordering of the packet in the stream.

10. A computer-implemented method for changing a network source of packet streams of an instance of media content from a first source to a second source, the first and second sources having copies of the same instance of media content, the method comprising:
    initiating a streaming session by communicating the instance in a first stream of packets from a first source to a mobile device, wherein the instance includes an internal timing mechanism that is useable to indicate temporal sequencing of packets comprising a stream of the instance, and wherein the first source is a computing device having a processor;
    determining that a second or a subsequent network source will stream the instance, the determining occurring prior to the initiating of the streaming session from the first source;
    identifying a point within the instance based on the internal timing mechanism at which a second source will begin streaming the instance to the mobile device;
    communicating the point to the second source; and communicating a second stream of packets from the second source, wherein the mobile device does not experience an interruption in the streaming session and does not experience an interruption in execution of the instance, and wherein no adjustment of the information regarding the sequencing of the packets within the stream is required.

11. The method of claim 10, wherein, determining that the second or a subsequent network source will stream the instance occurs at the first network source.

12. The method of claim 10, wherein, determining that the second or a subsequent network source will stream the instance occurs at a central network element.

13. The method of claim 10, wherein determining that the second or subsequent source will stream the instance occurs according to usage patterns.

14. The method of claim 10, wherein determining that the second or subsequent source will stream the instance occurs because of a changing device location.

15. The method of claim 10, wherein determining that the second or subsequent source will stream the instance occurs based on utilization of network resources.

16. The method of claim 10, wherein streams are communicated compatible with a real-time transport protocol.

17. The method of claim 10, wherein the instance is video content and the internal timing mechanism is the Society of Motion Picture and Television Engineers (SMPTE) time code.

* * * * *